US012686602B2

(12) United States Patent
Badger et al.

(10) Patent No.: US 12,686,602 B2
(45) Date of Patent: Jul. 21, 2026

(54) SYSTEMS AND METHODS FOR DETECTING INDIVIDUALS ON OR WITHIN A LIFT PLATFORM OF A LIFT SYSTEM

(71) Applicant: THE BOEING COMPANY, Arlington, VA (US)

(72) Inventors: Alexandru Gheorghe Badger, Stanwood, WA (US); Gerald Oren Pollard, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 400 days.

(21) Appl. No.: 18/462,598

(22) Filed: Sep. 7, 2023

(65) Prior Publication Data

US 2025/0083937 A1 Mar. 13, 2025

(51) Int. Cl.
| | |
|---|---|
| B66F 17/00 | (2006.01) |
| B66F 11/04 | (2006.01) |
| G01V 8/00 | (2006.01) |
| G01V 11/00 | (2006.01) |

(52) U.S. Cl.
CPC ............ B66F 17/006 (2013.01); G01V 8/005 (2013.01); G01V 11/00 (2013.01)

(58) Field of Classification Search
None
See application file for complete search history.

(56) References Cited

U.S. PATENT DOCUMENTS

| | | | |
|---|---|---|---|
| 6,991,067 B2 * | 1/2006 | Dube | B66F 11/042 |
| | | | 187/300 |
| 9,149,670 B1 | 10/2015 | Walker | |
| 9,359,779 B2 | 6/2016 | Borchardt | |
| 9,480,866 B2 | 11/2016 | Pollard | |
| 9,776,847 B2 * | 10/2017 | Mondal | G07C 5/0808 |

(Continued)

FOREIGN PATENT DOCUMENTS

| | | |
|---|---|---|
| CN | 111494901 | 8/2020 |
| EP | 1690567 | 8/2006 |

(Continued)

OTHER PUBLICATIONS

Extended European Search Report for EP 24192088.3-1113, dated Jan. 31, 2025.

(Continued)

*Primary Examiner* — Ariel Mercado-Vargas
(74) *Attorney, Agent, or Firm* — Joseph M. Butscher; Carroll, Hoette & Butscher, LLC

(57) ABSTRACT

A system and a method include a lift system including a lift platform. An object sensor is configured to detect one or more objects on or within the lift platform, and output image data including one or more images of the lift platform. A weight sensor is configured to detect a weight of the lift platform, and output weight data including the weight of the lift platform. A thermal sensor is configured to detect one or more temperatures of the one or more objects on or within the lift platform, and output thermal data including the one or more temperatures. A control unit is configured to receive the image data, the weight data, and the thermal data, and determine a number of individuals on or within the lift platform based on the data.

20 Claims, 5 Drawing Sheets

244 240A

242

214A 280

(56)  References Cited

U.S. PATENT DOCUMENTS

| | | | |
|---|---|---|---|
| 10,005,563 B2 | 6/2018 | Pollard et al. | |
| 10,358,331 B2 * | 7/2019 | Lombardo | B66F 17/006 |
| 10,399,697 B2 | 9/2019 | Pollard et al. | |
| 2012/0217091 A1 * | 8/2012 | Baillargeon | G08B 21/182 |
| | | | 182/18 |
| 2013/0118839 A1 * | 5/2013 | Penn | E04G 3/30 |
| | | | 187/262 |
| 2016/0236902 A1 * | 8/2016 | González Gallegos | |
| | | | G01G 23/01 |
| 2016/0332856 A1 * | 11/2016 | Steedley | B66F 17/006 |
| 2017/0107090 A1 * | 4/2017 | Mondal | G07C 5/0808 |
| 2018/0304468 A1 * | 10/2018 | Holz | B25J 9/1697 |
| 2020/0095105 A1 * | 3/2020 | Yutzy | B66F 17/006 |
| 2020/0317489 A1 * | 10/2020 | Bhatia | B66F 13/00 |
| 2021/0087035 A1 * | 3/2021 | Yip | G08B 21/02 |
| 2022/0340404 A1 * | 10/2022 | Sukalski | B66F 9/24 |
| 2023/0139590 A1 * | 5/2023 | Wilson | G05B 19/042 |
| | | | 700/28 |
| 2025/0262465 A1 * | 8/2025 | Viaouet | A62B 35/0075 |

FOREIGN PATENT DOCUMENTS

| | | |
|---|---|---|
| EP | 1956163 | 8/2008 |
| JP | 2022 015048 | 1/2022 |
| KR | 20130104393 | 9/2013 |
| KR | 20220125634 | 9/2022 |

OTHER PUBLICATIONS

Extended European Search Report for EP 24192150.1-1017, dated Jan. 24, 2025.
U.S. Appl. No. 18/324,436, filed May 26, 2023.
U.S. Appl. No. 18/457,407, filed Aug. 29, 2023.

* cited by examiner

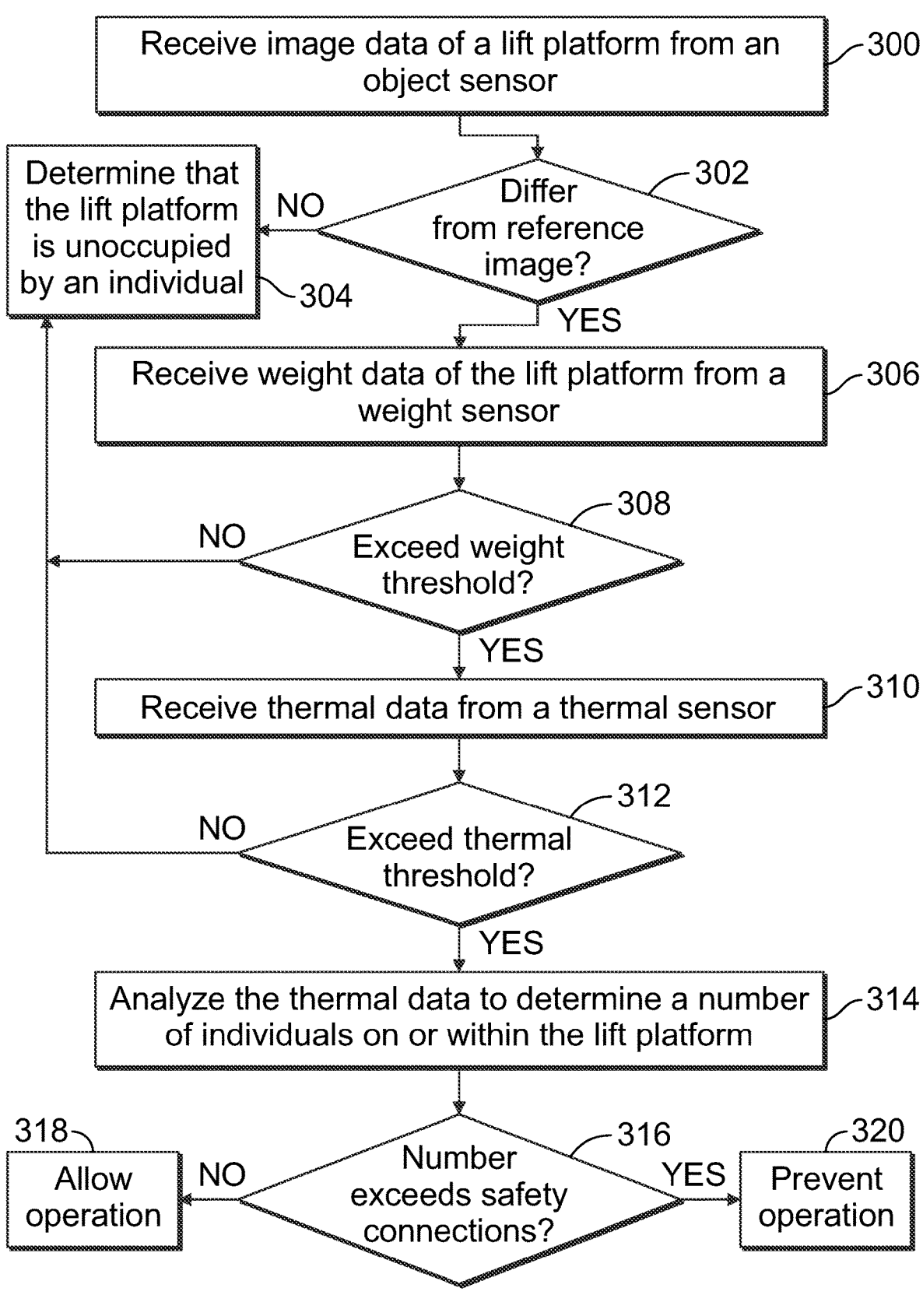

Receive image data of a lift platform from an object sensor ⟋300

Differ from reference image? ⟋302

Determine that the lift platform is unoccupied by an individual ⟍304 ← NO

YES

Receive weight data of the lift platform from a weight sensor ⟋306

Exceed weight threshold? ⟋308 — NO

YES

Receive thermal data from a thermal sensor ⟋310

Exceed thermal threshold? ⟋312 — NO

YES

Analyze the thermal data to determine a number of individuals on or within the lift platform ⟋314

Number exceeds safety connections? ⟋316

318⟍ Allow operation ← NO

YES → Prevent operation ⟋320

FIG. 6

SYSTEMS AND METHODS FOR DETECTING INDIVIDUALS ON OR WITHIN A LIFT PLATFORM OF A LIFT SYSTEM

FIELD OF THE DISCLOSURE

Examples of the present disclosure generally relate to lift systems, and more particularly, to systems and methods for detecting individuals on or within a lift platform of a lift system.

BACKGROUND OF THE DISCLOSURE

Regulations exist that require individuals using a lift system (for example, a boom lift, a scissor lift, etc.) to wear a fall protection harness that is to be connected to the lift system. For example, if an occupant falls from the lift, the fall distance is limited by a length of a safety strap that extends between the protection harness worn by the operator and the lift basket. The safety strap may have a safety key disposed at one end of the strap (that is opposite the end of the strap that is tethered to the harness of the operator) that may be coupled with one or more safety anchors of the lift basket. The safety anchors may be electrically coupled with a control system of the lift system, and a verification process may require confirmation that each safety key is securely coupled with at least one safety anchor before movement of the lift system is allowed.

Known fall protection systems are used to detect engagement of the safety equipment, and to prevent operation of the lift system if safety equipment (such as a fall protection harness) is not attached to an individual on the lift system. However, such systems are typically unable to determine how many people are on the lift system to ensure that a corresponding number of safety devices are properly connected.

SUMMARY OF THE DISCLOSURE

A need exists for a system and a method for accurately determining a number of individuals on a lift system. Further, a need exists for a system and a method for ensuring that individuals on a lift system are attached to required safety equipment, such as safety harnesses.

With those needs in mind, certain examples of the present disclosure provide a system including an object sensor configured to detect one or more objects on or within a lift platform of a lift system. The object sensor is further configured to output image data including one or more images of the lift platform. A weight sensor is configured to detect a weight of the lift platform. The weight sensor is further configured to output weight data including the weight of the lift platform. A thermal sensor is configured to detect one or more temperatures of the one or more objects on or within the lift platform. The thermal sensor is further configured to output thermal data including the one or more temperatures. A control unit is configured to receive the image data, the weight data, and the thermal data. The control unit is further configured to determine a number of individuals on or within the lift platform based on the image data, the weight data, and the thermal data.

The object sensor can include one or more of a still camera, a video camera, an ultrasonic sensor, a light detection and ranging (LIDAR) sensor, or an infrared sensor. The weight sensor can include a digital scale. The thermal sensor can include one or both of a thermometer or a thermal camera.

In at least one example, the thermal sensor is configured to detect a specific wavelength emitted by heat. The control unit is further configured to determine values within the thermal data based on matrix comprehension, and translate pixels into clusters.

In at least one example, the control unit is further configured to compare the number of individuals on or within the lift platform with a number of connections of safety equipment. As a further example, the control unit is also configured to allow operation of the lift system when the number of individuals on or within the lift platform equals the number of connections of safety equipment; and prevent operation of the lift system when the number of individuals on or within the lift platform exceeds the number of connections of safety equipment.

The control unit can also be configured to restrict operation of the lift system based on one or both of authorization or training of the number of individuals.

The control unit can be an artificial intelligence or machine learning system.

Certain examples of the present disclosure provide a method including detecting, by an object sensor, one or more objects on or within a lift platform of a lift system; outputting, by the object sensor, image data including one or more images of the lift platform; detecting, by a weight sensor, a weight of the lift platform; outputting, by the weight sensor, weight data including the weight of the lift platform; detecting, by a thermal sensor, one or more temperatures of the one or more objects on or within the lift platform; outputting, by the thermal sensor, thermal data including the one or more temperatures; receiving, by a control unit, the image data, the weight data, and the thermal data; and determining, by the control unit, a number of individuals on or within the lift platform based on the image data, the weight data, and the thermal data.

Certain examples of the present disclosure provide a non-transitory computer-readable storage medium comprising executable instructions that, in response to execution, cause one or more control units comprising a processor, to perform operations including: receiving image data including one or more images of one or more objects on or within a lift platform of a lift system; receiving weight data including a weight of the lift platform and the thermal data; receiving thermal data including one or more temperatures of the one or more objects on or within the lift platform; and determining a number of individuals on or within the lift platform based on the image data, the weight data, and the thermal data.

BRIEF DESCRIPTION OF THE DRAWINGS

FIG. 6 illustrates a flow chart of a method, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide systems and methods configured to determine a number of individuals on a lift system. The systems and methods can further verify that the individuals are securely attached to the lift system before allowing operation of the lift system. For example, the systems and methods are configured to accurately detect the number of individuals on an elevating platform, gantry, basket, or the like of the lift system. By determining an accurate count of the number of individuals on the lift system, the systems and methods described herein can then determine a number of safety equipment interlock connections to monitor.

Figure 1:
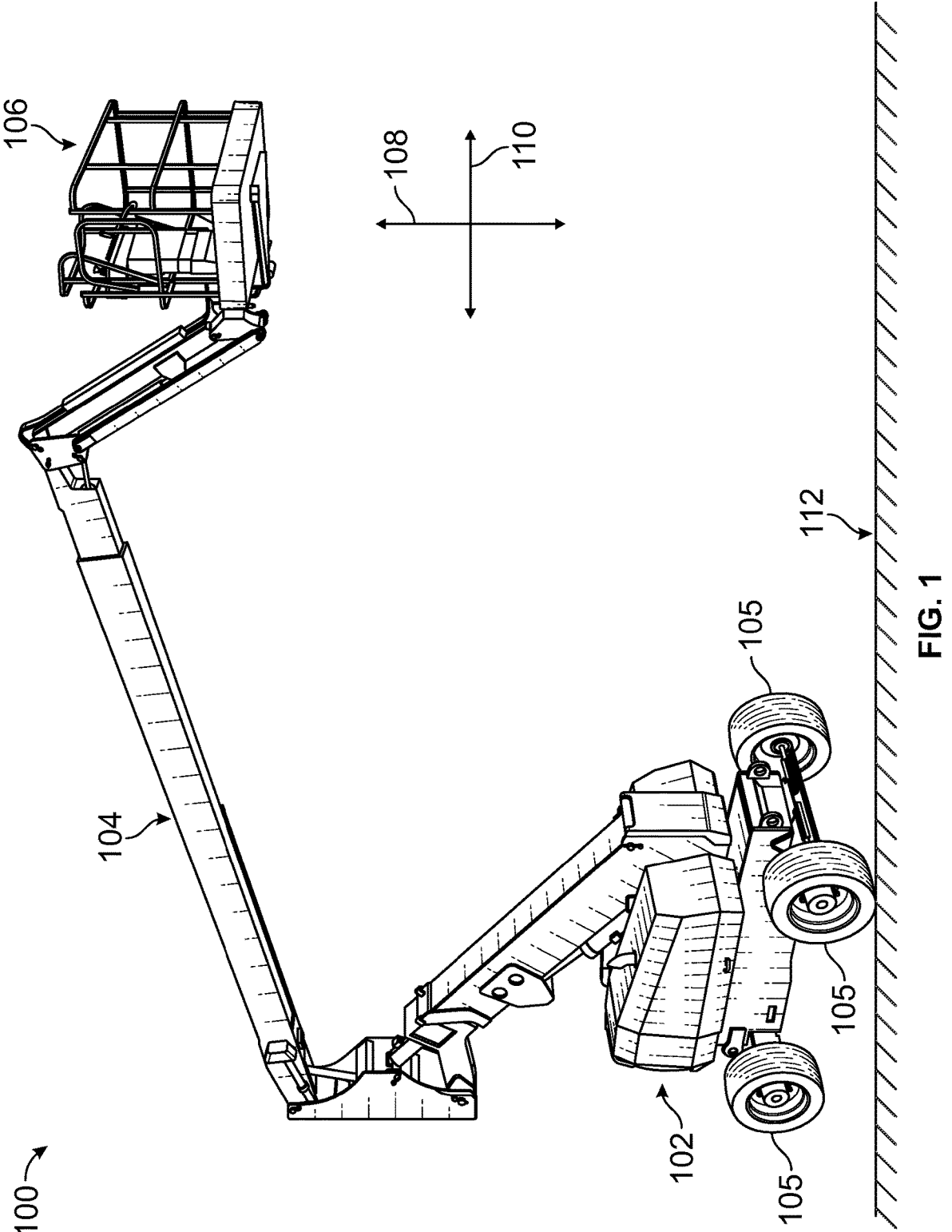
FIG. 1 illustrates an isometric view of a lift system, according to an example of the present disclosure.

FIG. 1 illustrates an isometric view of a lift system 100, according to an example of the present disclosure. The lift system includes a base 102 and a lift platform 106, such as a passenger basket, gantry, bucket, and/or the like. The lift system 100 further incudes one or more arms 104 that extend between the base 102 and the lift platform 106. In other examples, the lift system 100 may be a scissor lift system, or the like, that moves occupants and/or equipment between different elevations. In the illustrated example, the lift system 100 is a boom lift system, and the arm(s) 104 is controlled to move the passenger lift platform 106 in a vertical direction 108 (between a ground surface 112 and different elevations), and a horizontal or lateral direction 110. Additionally, the base 102 can include wheels 105 that can be controlled to move the lift system 100 in the horizontal direction 110.

Figure 2:
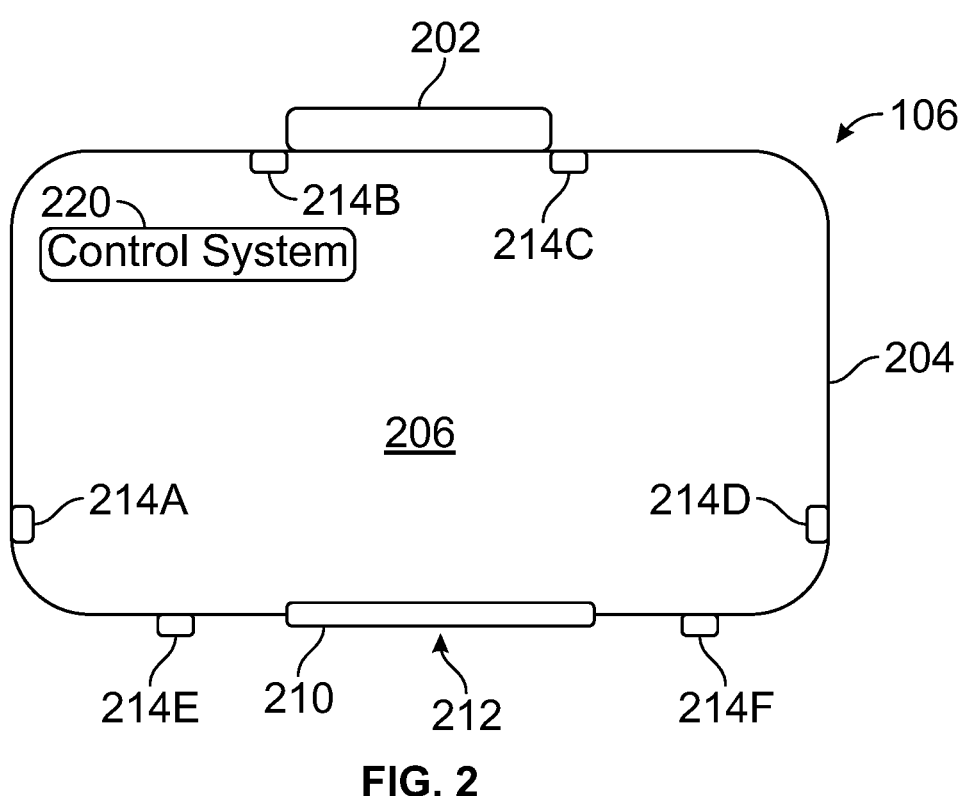
FIG. 2 illustrates a simplified top view of a passenger basket of a lift system, according to an example of the present disclosure.

FIG. 2 illustrates a simplified top view of the passenger lift platform 106, in according to an example of the present disclosure. The passenger lift platform 106 includes a basket frame 204 that is coupled with the arm (not shown in FIG. 2) at a joint 202. The passenger lift platform 106 includes an interior region 206 that is inside of the basket frame 204. For example, one or more occupants and/or equipment may be positioned within the interior region 206 of the basket frame 204 to move the occupants and/or equipment to different elevations.

The passenger lift platform 106 includes a gate 210 that is arranged to move between an open position and a closed position (shown in FIG. 2) in a direction of rotation 212. In another example, the gate 210 may have an alternative arrangement such that the gate 210 moves in one or more different directions between the open and closed positions.

The lift system 100 also includes a control system 220. In the illustrated example, the control system 220 is positioned within the passenger lift platform 106, but in alternative examples, the control system 220, or one or more components of the control system 220, may be disposed at other locations of the lift system, such as at the base 102.

Figure 3:
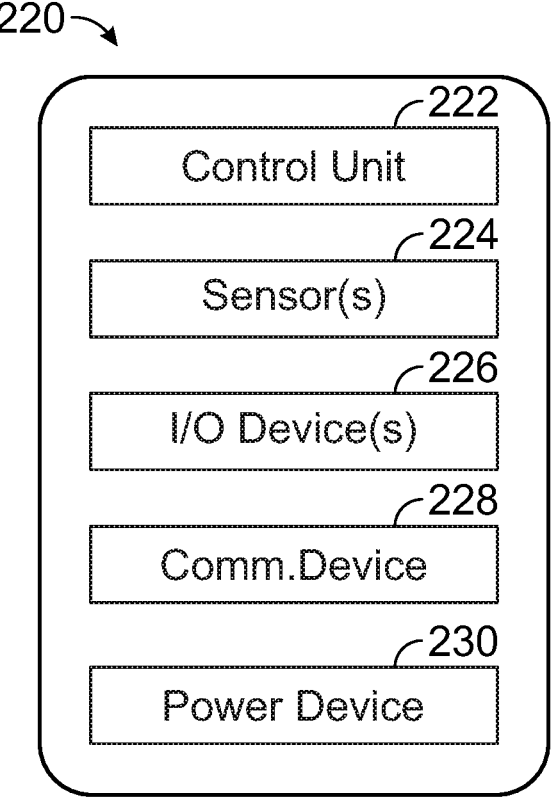
FIG. 3 illustrates a schematic of a controller of the passenger basket shown in FIG. 2, according to an example of the present disclosure.

FIG. 3 illustrates a schematic of one example of the control system 220. The control system 220 includes a controller or control unit 222 having one or more processors, such as one or more microprocessors, field programmable gate arrays, integrated circuits, and/or the like. In one example, the control unit 222 may include a single processor or multiple processors. All operations can be performed by each processor, or each processor may perform at least one different operation than one or more (or all) other processors.

In at least one example, the control system 220 includes one or more sensors 224. In at least one example, the sensors 224 include an object sensor, a weight sensor, and a thermal sensor. The one or more sensors 224 may include a position sensor, a camera (for example, a still camera, a video camera, an ergonomic camera, etc.), a pressure sensor, an ultrasonic sensor, a collision sensor, an infrared sensor, and/or the like. The one or more sensors 224 may be positioned at one or more locations of the passenger lift platform 106, may be operably coupled with the passenger lift platform 106, may be disposed outside of the lift platform 106, or any combination therein. In at least one example, the one or more sensors 224 may be referred to as occupant detector sensors. For example, the sensors 224 may sense or otherwise detect data associated with occupants and/or other loads (for example, equipment, materials, etc.) that are positioned within the passenger lift platform 106 such as, but not limited to, a number of occupants that are inside the lift platform 106, a location of each of the occupants within the interior region 206 of the passenger lift platform 106 (for example, relative to each other occupant, relative to the gate 210, etc.), a number of occupants that are disposed outside of the passenger lift platform 106 (for example, such as an occupant that has moved outside of the basket frame 204), a location of the equipment within the lift platform 106, a weight of the other loads, a total weight of the occupants and the other loads, and/or the like.

The control system 220 also includes one or more input and/or output devices 226 (shown as I/O Device(s) in FIG. 3). The lift system 100 (shown in FIG. 1) can be manually operated by receiving instruction signals from the input/output devices 226 that can represent a touchscreen, a joystick, a keyboard, a switch, a wheel, a microphone, a display, a monitor, a speaker, a light, or the like.

In one or more examples, the control system 220 also includes a communication device 228 that can include transceiving hardware (for example, antennas, wires, cables, modems, codecs, or the like) that can wirelessly communicate signals or communicate signals described herein via wired connections. The communication device 228 may communicate with the one or more occupants and/or operators positioned within the passenger lift platform 106, with one or more operators positioned proximate to the base 102 of the lift system 100, with one or more operators at a control center (not shown), and/or the like.

The control system 220 also includes a power device 230, that can be or include one or more batteries, fuel cells, or the like, that may provide power to one or more systems and/or components of the lift system 100 (for example, propulsion loads, auxiliary loads, etc.).

Returning again to FIG. 2, in one or more examples, the gate 210 may be moved from a closed position to an open position, such as to allow occupants and/or equipment to move into and/or out of the interior region 206 of the passenger lift platform 106. In one example, prior to the passenger lift platform 106 leaving the ground surface, or moving away from the ground surface, the gate 210 may be moved to a closed position, such as to contain the occupants and/or equipment within the interior region 206 of the passenger lift platform 106. In another example, after the passenger lift platform 106 has been moved to an elevated position (for example, to perform maintenance on a structure, such as a building, an aircraft system, utility equipment, or the like), the gate 210 may be moved to an open position to allow the occupants to move out of the interior region 206 of the passenger lift platform 106. For example, the occupant may need to move to a portion of a structure that is being repaired that is at a location that the passenger basket is unable to reach.

The passenger lift platform 106 also includes safety anchors 214A-E that are disposed at different locations around the basket frame 204. In the illustrated example, the passenger lift platform 106 includes four safety anchors 214A-D that are disposed at interior locations of the basket frame 204 (for example, within the interior region 206 of the passenger basket), and two safety anchors 214E-F that are disposed at exterior locations of the basket frame 204 (for example, outside of the basket frame). Each of the safety anchors 214A-F may be shaped and/or sized to receive a mating component, such as a safety key, that secures or anchors the one or more occupants to the passenger lift platform 106. For example, a first end of a safety strap or lanyard (not shown) may be operably coupled with at least one of the occupants (for example, attached to the occupant such as by a harness, a carabiner, or the like), and a second end of the safety strap may be operably coupled with a safety key.

Figure 4:
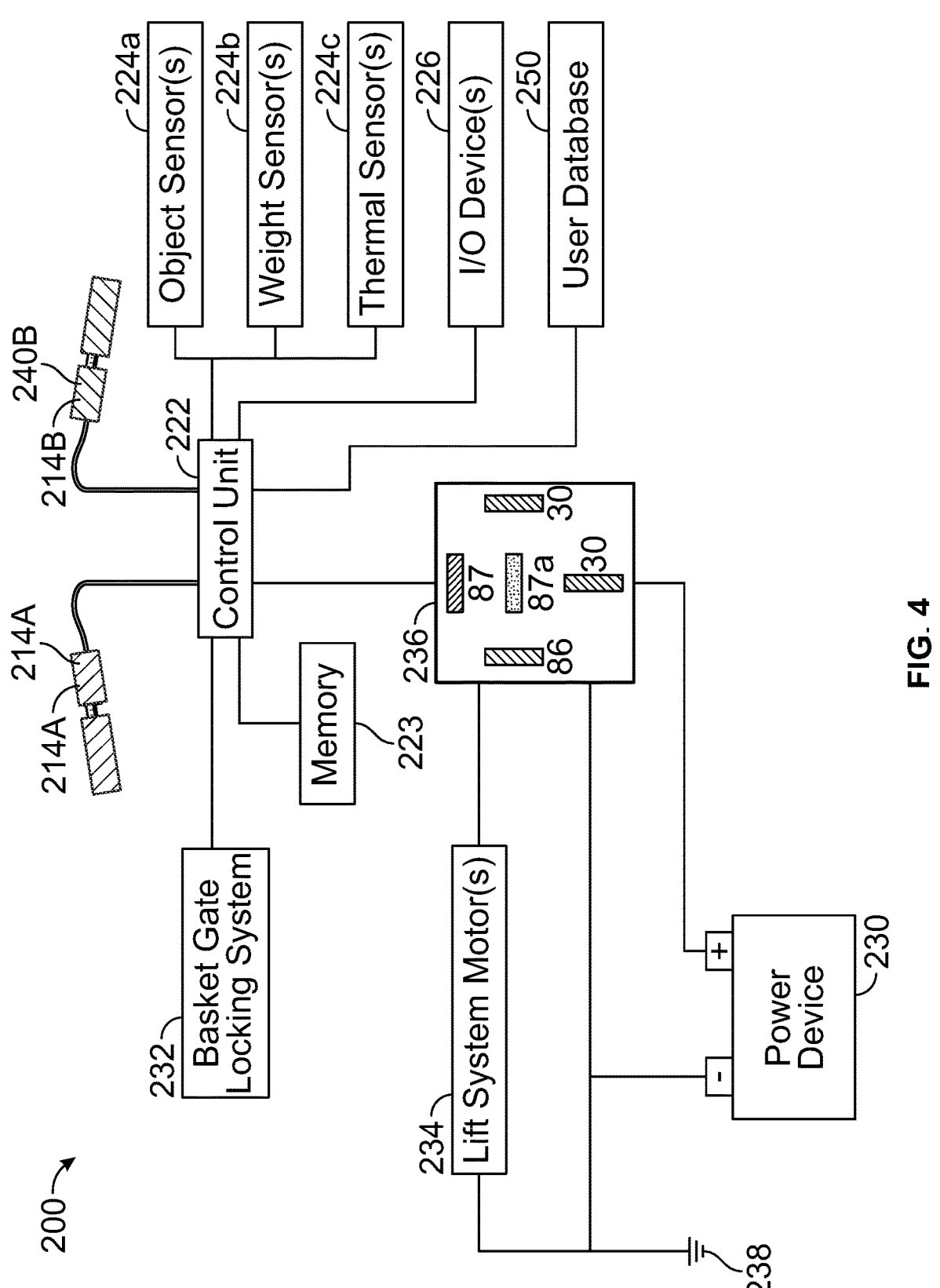
FIG. 4 illustrates a schematic of a lift system, according to an example of the present disclosure.

FIG. 4 illustrates a schematic of a lift system 200, according to an example of the present disclosure. The control unit 222 can be electrically coupled with the input/output device(s) 226, a locking system 232 of the basket gate (for example, an electronic and/or mechanical locking system that can control whether the gate can be opened and/or closed), one or more lift system motors 234 (for example, motors that control movement of the passenger basket and/or the base 102 of the lift system 100), and the power device 230 via a relay 236. The one or more lift system motors 234, the power device 230, and the relay 236 are also electrically coupled with an electrical ground 238. The schematic shown in FIG. 4 is for illustrative purposes only. In another example, the lift system 200 have an alternative configuration, may include one or more additional electrical components, may be devoid one or more components shown, and/or the like.

The control unit 222 is also in communication with various sensors, such as through one or more wired or wireless connections. In particular, the control unit 222 is in communication with one or more object sensors 224a, one or more weight sensors 224b, and one or more thermal sensors 224c. The object sensor(s) 224a are configured to detect a presence of one or more objects on and/or within a lift platform, such as the lift platform 106 shown and described with respect to FIGS. 1 and 2. In at least one example, the object sensor(s) 224a include optical sensors, such as including a still camera, a video camera, an ultrasonic sensor, a light detection and ranging (LIDAR) sensor, an infrared sensor, and/or the like. The object sensor(s) 224 is configured to acquire one or more optical images of the lift platform to determine a presence of one or more objects on or within the lift platform.

The weight sensor(s) 224b are configured to detect a weight of one or more objects on and/or within the lift platform. In at least one example, the weight sensor(s) 224b include a digital scale or the like coupled to the lift platform. The weight sensor(s) 224b are configured to detect a weight of the lift platform to determine a presence of one or more objects on or within the lift platform.

The thermal sensor(s) 224c are configured to detect a temperature of one or more objects on and/or within the lift platform. In at least one example, the thermal sensor(s) 224c include a digital thermometer, a thermal camera, and/or the like coupled to the lift platform, or another portion of the lift system. The thermal sensor(s) 224c are configured to detect a temperature of one or more objects on and/or within the lift platform.

In at least one example, the control unit 222 is also electrically coupled with a first safety anchor 214A and a second safety anchor 214B. In other examples, the controller may be electrically coupled with three or more safety anchors of the passenger lift platform 106. The first safety anchor 214A is coupled with a first safety key 240A, and the second safety anchor 214B is coupled with a second safety key 240B. The safety anchors and/or the safety keys can include one or more sensors that output a signal to the control unit 222 when the safety anchors are securely connected to the safety keys. In this manner, the control unit 222 can determine that safety equipment, such as a safety harness coupled to the safety key is properly connected to the lift platform.

Referring to FIGS. 1-4, in operation, before the control unit 222 allows the lift system 100 to be operated, the control unit 222 receives signals from the various sensors. In particular, an object sensor 224a first acquires one or more images of the lift platform 106, and outputs a signal including image data having image(s) to the control unit 222. The control unit 222 includes or is otherwise coupled to a memory 223, which stores data regarding the lift platform 106. For example, the memory 223 stores data regarding an unoccupied lift platform, which can be stored as a reference image. The control unit 222 compares the image data received from the object sensor 224a with the reference image to determine if there is a difference. If there is no difference (that is, the reference image of the unoccupied lift platform is the same as the image received from the object sensor 224a), the control unit 222 determines that the lift system 100 is unoccupied. Therefore, the control unit 222 determines that no safety equipment is required, and can further prevent operation of the lift system 100.

If, however, the control unit 222 determines that the image data received from the object sensor 224a differs from the reference image, the control unit 222 determines a presence of one or more objects on or within the lift platform 106. In this case, the control unit 222 then receives weight data from the weight sensor 224b. The memory 223 stores data regarding a weight of the lift platform 106, as well as a weight threshold regarding the presence of one or more individuals on or within the lift platform 106. In at least one example, the weight threshold may be 75 pounds (in addition to the weight of the lift platform 106). Optionally, the weight threshold may be less than 75 lbs. (such as 50 lbs.), or greater than 75 lbs. (such as 120 lbs.). The weight threshold is a predetermined magnitude indicative of the potential presence of at least one human being on or within the lift platform 106. As an example, a small bird on the lift platform 106 represents a weight that is substantially less than the weight threshold.

The control unit 222 compares the weight as received in the weight data from the weight sensor 224b with the weight threshold stored in the memory 223. If the weight data is less than the weight threshold, the control unit 222 determines that the lift platform 106 is unoccupied by an individual. Accordingly, the control unit 222 determines that no safety equipment is required, and can further prevent operation of the lift system 100.

If, however, the control unit 222 determines that the weight as received in the weight data from the weight sensor 224*b* exceeds the weight threshold, the control unit 222 determines a presence of one or more objects on or within the lift platform 106. In this case, the control unit 222 then receives thermal data from the thermal sensor 224*c* to determine if the objects are individuals (that is, human beings), and further the number individuals. In particular, the thermal sensor 224*c* detects a temperature of the objects on or within the lift platform 106. The memory 223 stores a thermal threshold indicative of a temperature of at least one individual. For example, the thermal threshold may be 95 degrees Fahrenheit. Optionally, the thermal threshold may be less (such as 93 degrees Fahrenheit) or greater (such as 98.6 degrees Fahrenheit). The thermal threshold is a predetermined magnitude indicative of the potential presence of at least one human being on or within the lift platform 106.

As an example, the control unit 222 can visualize hotspots through the thermal data received from the thermal sensor 224*c*. In at least one example, the thermal sensor 224*c*, such as a thermal camera, detects a specific wavelength emitted by heat. Based on the hotspots, the control unit 222 can use a process involving matrix comprehension to determine values received from the thermal sensor 224*c*, and translate pixels into clusters. The control unit 222 can then assign the clusters values, and based on predetermined conditional programming (such as stored in the memory 223), the control unit 22 can further assign rules and conditions.

As an example, the control unit 222 can receives a thermal data including a thermal image from the thermal sensor 224*c*. The thermal image can be presented by a column of 2's, for example. When carrying an object, such as an aircraft part, within the lift platform 106, the aircraft part can be represented by the column of 2's, which the control unit 222 can determine is not a human being. Instead, a human being can be presented by a different shape or different numbers (such as 4's or 5's, for example).

The control unit 222 compares the thermal data as received in the thermal data from the thermal sensor 224*c* with the thermal threshold stored in the memory 223. If the thermal data is less than the thermal threshold, the control unit 222 determines that the lift platform 106 is unoccupied by an individual. Accordingly, the control unit 222 determines that no safety equipment is required, and can further prevent operation of the lift system 100.

If, however, the control unit 222 determines that the thermal data exceeds the thermal threshold, the control unit 222 determines the presence of at least one individual on or within the lift platform 106. After determining the presence of at least one individual on or within the lift platform 106, the control unit 222 then further analyzes the thermal data received from the thermal sensor 224*c* to detect a number of individuals on or within the lift platform 106. For example, the memory 223 can stores reference thermal data indicative of thermal signatures of human beings. The control unit 222 can compare the thermal data received from the thermal sensor 224*c* in relation to the reference thermal data, and determine a number of thermal signatures based on such comparison. The control unit 222 can then differentiate between different portions of the thermal data in relation to the thermal signatures to determine a number of individuals on or within the lift platform 106.

As described herein, a system includes the lift platform 106. The object sensor 224*a* is configured to detect one or more objects on or within the lift platform 106. The object sensor 224*a* is further configured to output image data including one or more images of the lift platform 106. The weight sensor 224*b* is configured to detect a weight of the lift platform 106. The weight sensor 224*b* is further configured to output weight data including the weight of the lift platform 106. The thermal sensor 224*c* is configured to detect one or more temperatures of the one or more objects on or within the lift platform 106. The thermal sensor 224*c* is further configured to output thermal data including the one or more temperatures. The control unit 222 is configured to receive the image data, the weight data, and the thermal data. The control unit 222 is further configured to determine a number of individuals on or within the lift platform 106 based on the image data, the weight data, and the thermal data.

In at least one example, based on the number of individuals detected on or within the lift platform 106, the control unit 222 can then analyze signals received from the safety equipment, such as safety anchors and safety keys. As noted, one or both of the safety anchors and the safety keys includes an electronic sensor that outputs a signal indicative of the safety anchors being connected to the safety keys, which further indicates that individuals are safely connected to the lift platform 106. Thus, the control unit 222 compares the number of signals received from the safety equipment with the number of detected individuals on the lift platform 106. If the number of signals received from the safety equipment equals the number of detected individuals on the lift platform 106, the control unit 222 then allows the lift system 100 to be operated. If, however, the number of signals received form the safety equipment is less than the number of detected individuals on or within the lift platform 106, the control unit 222 prevents operation of the lift system 100.

As described herein, in at least one example, the control unit 222 is further configured to compare the number of individuals on or within the lift platform 106 with a number of connections of safety equipment (for example, a number of signals received from one or more portions of the safety equipment indicating that an individual is properly secured to one or more portions of the lift system 100). The control unit 222 can be further configured to allow operation of the lift system 100 when the number of individuals on or within the lift platform equals the number of connections of safety equipment, and prevent operation of the lift system 100 when the number of individuals on or within the lift platform exceeds the number of connections of safety equipment.

In at least one example, the control unit 222 can also be in communication with a user database 250, such as through one or more wired or wireless connections. The user database 250 stores information regarding authorized and/or trained operators of the lift system 100, for example, The individuals on or within the lift platform 106 may wear identification devices, such as badges having electronic chips, radio frequency identification (RFID) tags, and/or the like. The control unit 222 can be in communication with such identification devices. The control unit 222 may compare identities of the individuals with data stored in the database to determine if such individuals are authorized and/or trained to operate the lift system 100. The control unit 222 may then restrict operation of the lift system 100 accordingly. Optionally, the control unit 222 is not in communication with the user database 250, and may not restrict operation of the lift system 100 based on authorization and/or training.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 222 may be or include one or more processors that are configured to control operation, as described herein.

The control unit 222 is configured to execute a set of instructions that are stored in one or more data storage units or elements (such as one or more memories), in order to process data. For example, the control unit 222 may include or be coupled to one or more memories. The data storage units may also store data or other information as desired or needed. The data storage units may be in the form of an information source or a physical memory element within a processing machine.

The set of instructions may include various commands that instruct the control unit 222 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 222. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 222 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 222 can be an artificial intelligence or machine learning system. These types of systems may be trained from outside information and/or self-trained to repeatedly improve the accuracy with how data is analyzed to determine the presence and nature of objects on or within the lift platform 106. Over time, these systems can improve by determining shape, weight, and heat signatures with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of the data received from the sensors. Based on this feedback, the systems may be trained by adjusting one or more parameters, weights, rules, criteria, or the like, used in the analysis of the same. This process can be performed using the data instead of training data, and may be repeated many times to repeatedly improve the determination of the presence and nature of objects on or within the lift platform 106. The training minimizes conflicts and interference by performing an iterative training algorithm, in which the systems are retrained with an updated set of data and based on the feedback examined prior to the most recent training of the systems. This provides a robust analysis model that can better determine the presence, nature, and number of individuals on or within the lift platform 106.

Figure 5:
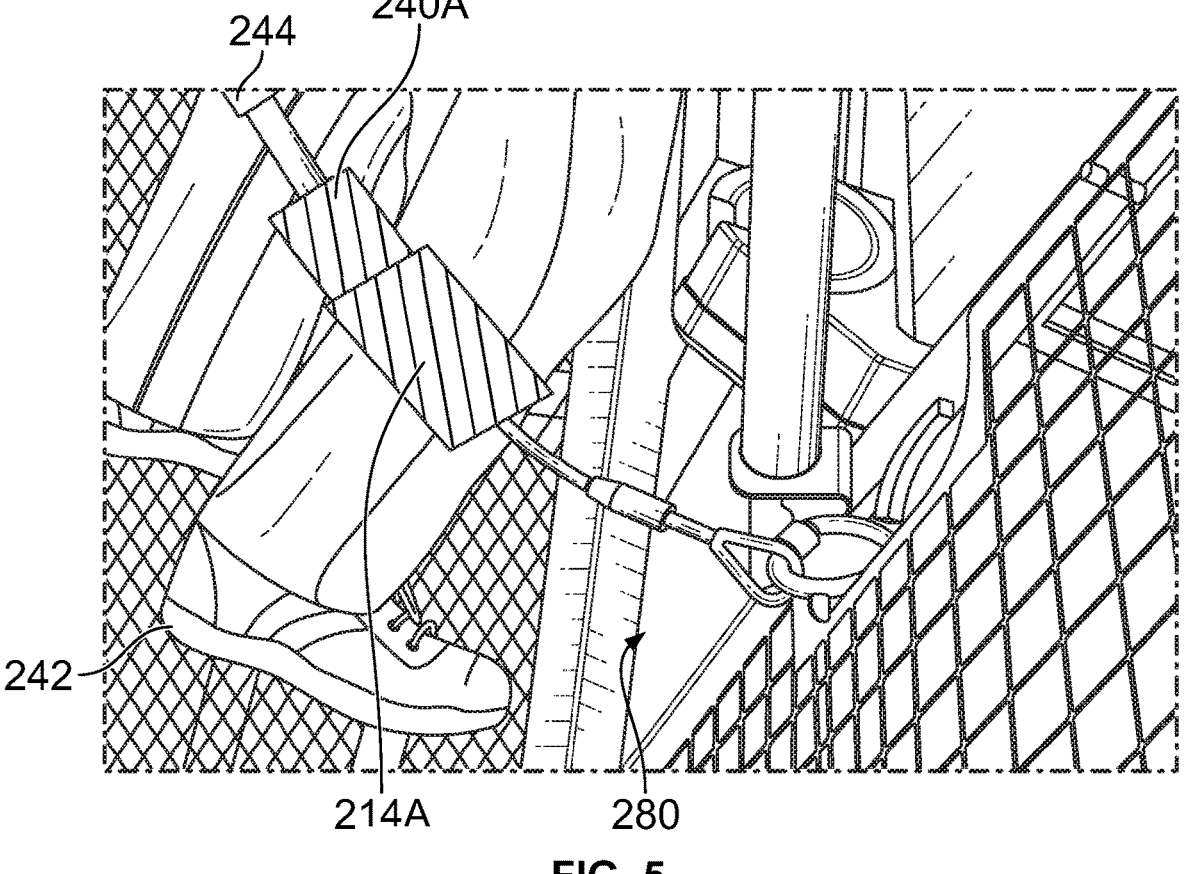
FIG. 5 illustrates a partial view of a safety key operably coupled with a safety anchor of a passenger basket, according to an example of the present disclosure.

FIG. 5 illustrates a partial magnified view of the safety key 240A that is coupled with the first safety anchor 214A, according to an example of the present disclosure. The safety key and the safety anchor are part of safety equipment. As noted, one or both of the safety key and/or the safety anchor output a signal to the control unit 222 (shown in FIG. 4) when the safety key is properly connected to the safety anchor.

Referring to FIGS. 1-5, the safety key 240A and the safety anchor 214 provide a connection assembly for safety equipment, such as a fall protection system 280 that is configured to prevent an individual from falling from the passenger lift platform 106 of the lift system 100. The safety key 240A is operably coupled with a first end of a safety strap 244 or safety lanyard. A second end of the safety strap 244 may be fastened or coupled with an individual 242 on and/or within the lift platform 106. While the individual is anchored to the safety anchor of the passenger lift platform 106 via the safety key 240A, the safety of the individual increases relative to the individual not being secured or tethered to the safety anchor via the safety key.

FIG. 6 illustrates a flow chart of a method, according to an example of the present disclosure. Referring to FIGS. 1-6, at 300, the control unit 222 receives image data of the lift platform 106 from the object sensor 224*a*. At 302, the control unit 222 determines if the image(s) within the image data differs from the stored reference image. If not, the method proceeds to 304, at which the control unit 222 determines that the lift platform 106 is unoccupied by an individual.

If, however, the image differs from the reference image at 302, the method proceeds to 306, at which the control unit 222 receives weight data of the lift platform 106 from the weight sensor 224*b*. At 308, the control unit 222 determines if the weight within the weight data exceeds the stored weight threshold. If not, the method proceeds to 304, at which the control unit 222 determines that the lift platform 106 is unoccupied by an individual.

If, however, the weight exceeds the weight threshold at 308, the method proceeds to 310, at which the control unit 222 receives thermal data from the thermal sensor 224*c*. At 312, the control unit 222 determines if the thermal data exceeds the stored thermal threshold. If not, the method proceeds to 304, at which the control unit 222 determines that the lift platform 106 is unoccupied by an individual.

If, however, the thermal data exceeds the thermal threshold at 312, the method proceeds to 314, at which the control unit 314 analyzes the thermal data to determine a number of individuals on or within the lift platform 106. The method may then proceed to 316, at which the control unit 222 determines if the number of individuals on or within the lift platform 106 exceeds a number of connections of safety equipment. If the number of individuals does not exceed the number of safety connections at 316, the method proceeds to 318, at which the control unit 222 allows operation of the lift system 100. If, however, the number of individuals exceeds the number of safety connections at 316, the method proceeds to 320, at which the control unit 222 prevents operation of the lift system 100.

Further, the disclosure comprises examples according to the following clauses:

Clause 1: A system comprising:

an object sensor configured to detect one or more objects on or within a lift platform of a lift system, the object sensor further configured to output image data including one or more images of the lift platform;

a weight sensor configured to detect a weight of the lift platform, the weight sensor further configured to output weight data including the weight of the lift platform;

a thermal sensor configured to detect one or more temperatures of the one or more objects on or within the lift platform, the thermal sensor further configured to output thermal data including the one or more temperatures; and a control unit configured to receive the image data, the weight data, and the thermal data, wherein the control unit is further configured to determine a number of individuals on or within the lift platform based on the image data, the weight data, and the thermal data.

Clause 2. The system of Clause 1, wherein the object sensor comprises one or more of a still camera, a video camera, an ultrasonic sensor, a light detection and ranging (LIDAR) sensor, or an infrared sensor.

Clause 3. The system of Clauses 1 or 2, wherein the weight sensor comprises a digital scale.

Clause 4. The system of any of Clauses 1-3, wherein the thermal sensor comprises one or both of a thermometer or a thermal camera.

Clause 5. The system of any of Clauses 1-4, wherein the thermal sensor is configured to detect a specific wavelength emitted by heat, and wherein the control unit is further configured to determine values within the thermal data based on matrix comprehension, and translate pixels into clusters.

Clause 6. The system of any of Clauses 1-5, wherein the control unit is further configured to compare the number of individuals on or within the lift platform with a number of connections of safety equipment.

Clause 7. The system of any of Clauses 1-6, wherein the control unit is further configured to:

allow operation of the lift system when the number of individuals on or within the lift platform equals the number of connections of safety equipment; and prevent operation of the lift system when the number of individuals on or within the lift platform exceeds the number of connections of safety equipment.

Clause 8. The system of any of Clauses 1-7, wherein the control unit is further configured to restrict operation of the lift system based on one or both of authorization or training of the number of individuals.

Clause 9. The system of any of Clauses 1-8, wherein the control unit is an artificial intelligence or machine learning system.

Clause 10. A method comprising:

detecting, by an object sensor, one or more objects on or within a lift platform of a lift system;

outputting, by the object sensor, image data including one or more images of the lift platform;

detecting, by a weight sensor, a weight of the lift platform;

outputting, by the weight sensor, weight data including the weight of the lift platform;

detecting, by a thermal sensor, one or more temperatures of the one or more objects on or within the lift platform;

outputting, by the thermal sensor, thermal data including the one or more temperatures;

receiving, by a control unit, the image data, the weight data, and the thermal data; and determining, by the control unit, a number of individuals on or within the lift platform based on the image data, the weight data, and the thermal data.

Clause 11. The method of Clause 10, wherein the object sensor comprises one or more of a still camera, a video camera, an ultrasonic sensor, a light detection and ranging (LIDAR) sensor, or an infrared sensor.

Clause 12. The method of Clauses 10 or 11, wherein the weight sensor comprises a digital scale.

Clause 13. The method of any of Clauses 10-12, wherein the thermal sensor comprises one or both of a thermometer or a thermal camera.

Clause 14. The method of any of Clauses 10-13, wherein said detecting, by the thermal sensor, comprises:

detecting a specific wavelength emitted by heat;

determining values within the thermal data based on matrix comprehension; and translating pixels into clusters.

Clause 15. The method of any of Clauses 10-14, further comprising comparing, by the control unit, the number of individuals on or within the lift platform with a number of connections of safety equipment.

Clause 16. The method of Clause 15, further comprising:

allowing, by the control unit, operation of the lift system when the number of individuals on or within the lift platform equals the number of connections of safety equipment; and preventing, by the control unit, operation of the lift system when the number of individuals on or within the lift platform exceeds the number of connections of safety equipment.

Clause 17. The method of any of Clauses 10-16, further comprising restricting, by the control unit, operation of the lift system based on one or both of authorization or training of the number of individuals.

Clause 18. The method of any of Clauses 10-17, wherein the control unit is an artificial intelligence or machine learning system.

Clause 19. A non-transitory computer-readable storage medium comprising executable instructions that, in response to execution, cause one or more control units comprising a processor, to perform operations comprising:

receiving image data including one or more images of one or more objects on or within a lift platform of a lift system;

receiving weight data including a weight of the lift platform and the thermal data;

receiving thermal data including one or more temperatures of the one or more objects on or within the lift platform; and determining a number of individuals on or within the lift platform based on the image data, the weight data, and the thermal data.

Clause 20. The non-transitory computer-readable storage medium of Clause 19, further comprising:

comparing the number of individuals on or within the lift platform with a number of connections of safety equipment;

allowing operation of the lift system when the number of individuals on or within the lift platform equals the number of connections of safety equipment; and preventing operation of the lift system when the number of individuals on or within the lift platform exceeds the number of connections of safety equipment.

As described herein, examples of the present disclosure provide systems and methods for accurately determining a number of individuals on a lift system. Further, examples of the present disclosure provide systems and methods for ensuring that individuals on a lift system are attached to required safety equipment, such as safety harnesses.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

an object sensor configured to detect one or more objects on or within a lift platform of a lift system, the object sensor further configured to output image data including one or more images of the lift platform;

a weight sensor configured to detect a weight of the lift platform, the weight sensor further configured to output weight data including the weight of the lift platform;

a thermal sensor configured to detect one or more temperatures of the one or more objects on or within the lift platform, the thermal sensor further configured to output thermal data including the one or more temperatures, wherein the thermal sensor is configured to detect a specific wavelength emitted by heat; and a control unit configured to receive the image data, the weight data, and the thermal data, wherein the control unit is further configured to determine a number of individuals on or within the lift platform based on the image data, the weight data, and the thermal data, and wherein the control unit is further configured to determine values within the thermal data based on matrix comprehension, and translate pixels into clusters.

2. The system of claim 1, wherein the object sensor comprises one or more of a still camera, a video camera, an ultrasonic sensor, a light detection and ranging (LIDAR) sensor, or an infrared sensor.

3. The system of claim 1, wherein the weight sensor comprises a digital scale.

4. The system of claim 1, wherein the thermal sensor comprises one or both of a thermometer or a thermal camera.

5. The system of claim 1, wherein the control unit is further configured to compare the number of individuals on or within the lift platform with a number of connections of safety equipment.

6. The system of claim 5, wherein the control unit is further configured to:

allow operation of the lift system when the number of individuals on or within the lift platform equals the number of connections of safety equipment; and prevent operation of the lift system when the number of individuals on or within the lift platform exceeds the number of connections of safety equipment.

7. The system of claim 1, wherein the control unit is further configured to restrict operation of the lift system based on one or both of authorization or training of the number of individuals.

8. The system of claim 1, wherein the control unit is an artificial intelligence or machine learning system.

9. A method comprising:

detecting, by an object sensor, one or more objects on or within a lift platform of a lift system;

outputting, by the object sensor, image data including one or more images of the lift platform;

detecting, by a weight sensor, a weight of the lift platform;

outputting, by the weight sensor, weight data including the weight of the lift platform;

detecting, by a thermal sensor, one or more temperatures of the one or more objects on or within the lift platform, wherein said detecting, by the thermal sensor, comprises detecting a specific wavelength emitted by heat, determining values within thermal data based on matrix comprehension, and translating pixels into clusters;

outputting, by the thermal sensor, the thermal data including the one or more temperatures;

receiving, by a control unit, the image data, the weight data, and the thermal data; and determining, by the control unit, a number of individuals on or within the lift platform based on the image data, the weight data, and the thermal data.

10. The method of claim 9, wherein the object sensor comprises one or more of a still camera, a video camera, an ultrasonic sensor, a light detection and ranging (LIDAR) sensor, or an infrared sensor.

11. The method of claim 9, wherein the weight sensor comprises a digital scale.

12. The method of claim 9, wherein the thermal sensor comprises one or both of a thermometer or a thermal camera.

13. The method of claim 9, further comprising comparing, by the control unit, the number of individuals on or within the lift platform with a number of connections of safety equipment.

14. The method of claim 13, further comprising allowing, by the control unit, operation of the lift system when the number of individuals on or within the lift platform equals the number of connections of safety equipment.

15. The method of claim 14, further comprising preventing, by the control unit, operation of the lift system when the number of individuals on or within the lift platform exceeds the number of connections of safety equipment.

16. The method of claim 9, further comprising restricting, by the control unit, operation of the lift system based on one or both of authorization or training of the number of individuals.

17. The method of claim 9, wherein the control unit is an artificial intelligence or machine learning system.

18. A non-transitory computer-readable storage medium comprising executable instructions that, in response to execution, cause one or more control units comprising a processor, to perform operations comprising:

receiving image data including one or more images of one or more objects on or within a lift platform of a lift system;

receiving weight data including a weight of the lift platform;

detecting one or more temperatures of the one or more objects on or within the lift platform, wherein said detecting the one or more temperatures comprises detecting a specific wavelength emitted by heat, determining values within thermal data based on matrix comprehension, and translating pixels into clusters;

receiving the thermal data including one or more temperatures of the one or more objects on or within the lift platform; and determining a number of individuals on or within the lift platform based on the image data, the weight data, and the thermal data.

19. The non-transitory computer-readable storage medium of claim 18, further comprising:

comparing the number of individuals on or within the lift platform with a number of connections of safety equipment;

allowing operation of the lift system when the number of individuals on or within the lift platform equals the number of connections of safety equipment; and preventing operation of the lift system when the number of individuals on or within the lift platform exceeds the number of connections of safety equipment.

20. The non-transitory computer-readable storage medium of claim 18, further comprising restricting operation of the lift system based on one or both of authorization or training of the number of individuals.

* * * * *